(12) United States Patent
Tsukamoto et al.

(10) Patent No.: US 9,640,956 B2
(45) Date of Patent: May 2, 2017

(54) ELECTRIC WIRE PROTECTIVE MEMBER (71) Applicant: Yazaki Corporation, Minato-ku, Tokyo (JP)

(72) Inventors: Masashi Tsukamoto, Makinohara (JP); Masaaki Endo, Makinohara (JP)

(73) Assignee: Yazaki Corporation, Minato-ku, Tokyo (JP)

(*) Notice: Subject to any disclaimer, the term of this patent is extended or adjusted under 35 U.S.C. 154(b) by 0 days.

(21) Appl. No.: 14/909,859

(22) PCT Filed: Aug. 7, 2014

(86) PCT No.: PCT/JP2014/070817
§ 371 (c)(1),
(2) Date: Feb. 3, 2016

(87) PCT Pub. No.: WO2015/020126
PCT Pub. Date: Feb. 12, 2015

(65) Prior Publication Data
US 2016/0190782 A1 Jun. 30, 2016

(30) Foreign Application Priority Data
Aug. 7, 2013 (JP) .................. 2013-164473

(51) Int. Cl.
H02G 3/04 (2006.01)
H02G 3/06 (2006.01)
H02G 3/34 (2006.01)

(52) U.S. Cl.
CPC ......... *H02G 3/0406* (2013.01); *H02G 3/0468* (2013.01); *H02G 3/06* (2013.01); *H02G 3/34* (2013.01)

(58) Field of Classification Search
USPC ............................ 174/72 A, 74 R
See application file for complete search history.

(56) References Cited

U.S. PATENT DOCUMENTS 1,238,885 A * 9/1917 Chmela ............... H02G 15/113
174/71 R
3,151,211 A * 9/1964 Reid .................... H01R 9/0506
174/72 R (Continued)

FOREIGN PATENT DOCUMENTS

CN 1267105 A 9/2000
CN 101304166 A 11/2008

(Continued)

OTHER PUBLICATIONS

Sep. 30, 2014—(WO) Written Opinion of the ISA—App PCT/JP2014/070817, Eng Tran.

(Continued)

Primary Examiner — Chau N Nguyen
Assistant Examiner — Muhammed Azam
(74) Attorney, Agent, or Firm — Banner & Witcoff, Ltd.

(57) ABSTRACT

An electric wire protective member includes a cylindrical electric wire protection tube, an interior of which being an electric wire insertion space, a protection tube end opening provided in the electric wire protection tube and from which electric wires inserted through the electric wire insertion space are led out, and an electric wire fastening member having an electric wire fastening plate on which the electric wires led out through the protection tube end opening are placed. The electric wire fastening plate is molded integrally with a ring-shaped covering portion covering the electric wire protection tube near the protection tube end opening.

6 Claims, 10 Drawing Sheets (56) References Cited

U.S. PATENT DOCUMENTS

| | | | | | |
|---|---|---|---|---|---|
| 3,465,092 | A | * | 9/1969 | Schwartz | H01R 4/646 174/78 |
| 3,711,632 | A | * | 1/1973 | Ghirardi | H02G 3/06 174/135 |
| 3,711,633 | A | * | 1/1973 | Ghirardi | H02G 3/06 174/135 |
| 4,074,044 | A | * | 2/1978 | Hess | C07C 405/00 549/415 |
| 4,384,167 | A | * | 5/1983 | Nestor | H02G 3/0468 174/135 |
| 4,538,869 | A | * | 9/1985 | Richards | H01R 4/70 439/596 |
| 4,797,512 | A | * | 1/1989 | Kumagai | H02G 15/18 174/135 |
| 4,880,943 | A | * | 11/1989 | Kuzuno | H01B 7/0853 174/71 R |
| 4,939,512 | A | * | 7/1990 | Dennison | G08G 1/042 174/71 R |
| 5,266,740 | A | * | 11/1993 | Hsu | H01R 13/516 174/135 |
| 5,444,182 | A | * | 8/1995 | Hoshino | H01R 13/506 174/72 A |
| D371,808 | S | * | 7/1996 | Gilbert | D21/300 |
| 6,226,937 | B1 | * | 5/2001 | Carlton | E02B 11/005 285/901 |
| 6,246,001 | B1 | * | 6/2001 | Fukui | H01R 9/034 174/78 |
| 6,256,664 | B1 | * | 7/2001 | Donoho | G06Q 10/10 709/204 |
| 6,555,748 | B1 | * | 4/2003 | Gul | H05K 5/0247 174/59 |
| 6,603,074 | B2 | * | 8/2003 | Seo | H02G 3/0468 174/102 D |
| D481,110 | S | * | 10/2003 | Snyder, Sr. | D23/263 |
| 6,730,847 | B1 | * | 5/2004 | Fitzgerald | H01R 4/22 174/74 R |
| D516,686 | S | * | 3/2006 | Wilk, Jr. | D23/262 |
| D517,176 | S | * | 3/2006 | Wilk, Jr. | D23/262 |
| 7,112,745 | B2 | * | 9/2006 | Hatori | H01R 4/22 174/71 R |
| 7,663,059 | B2 | * | 2/2010 | Daitou | H02G 15/043 174/77 R |
| 7,709,736 | B2 | * | 5/2010 | Irisawa | B60R 16/0215 174/135 |
| D634,819 | S | * | 3/2011 | Leroyer | D23/263 |
| 7,964,796 | B2 | * | 6/2011 | Suzuki | B60R 16/0215 174/72 A |
| D656,225 | S | * | 3/2012 | Dole | D23/263 |
| D741,459 | S | * | 10/2015 | Guest | D23/262 |
| D743,511 | S | * | 11/2015 | Bednarz | D23/263 |
| 9,257,822 | B2 | | 2/2016 | Kitamura | |
| 9,337,634 | B2 | * | 5/2016 | Sato | H02G 3/0481 |
| 2002/0079697 | A1 | * | 6/2002 | Griffioen | F16L 41/023 285/123.1 |
| 2002/0092665 | A1 | * | 7/2002 | Huang | H01R 33/09 174/74 A |
| 2002/0179318 | A1 | * | 12/2002 | Seo | H02G 3/0468 174/71 R |
| 2002/0194732 | A1 | * | 12/2002 | Tadokoro | H02G 3/0468 29/868 |
| 2003/0015340 | A1 | * | 1/2003 | Tsukamoto | B60R 16/0215 174/72 A |
| 2005/0029005 | A1 | * | 2/2005 | Arai | H02G 3/30 174/72 A |
| 2005/0056442 | A1 | * | 3/2005 | Santanda | H02G 3/34 174/481 |
| 2005/0106934 | A1 | * | 5/2005 | Hatori | H01R 13/5833 439/501 |
| 2005/0133247 | A1 | * | 6/2005 | Hatori | H01R 4/22 174/135 |
| 2005/0153576 | A1 | * | 7/2005 | Fukuda | H01B 7/0045 439/34 |
| 2007/0240895 | A1 | * | 10/2007 | Peterson | H02G 3/00 174/72 A |
| 2008/0023223 | A1 | * | 1/2008 | Suzuki | H02G 3/0481 174/72 A |
| 2009/0019406 | A1 | * | 1/2009 | Endoh | G06F 17/5022 716/106 |
| 2009/0272576 | A1 | * | 11/2009 | Medina | B60R 16/0215 174/72 A |
| 2010/0230157 | A1 | * | 9/2010 | Sakata | B60R 16/0215 174/72 A |
| 2012/0132465 | A1 | * | 5/2012 | Mabuchi | H02G 3/32 174/72 A |
| 2012/0261184 | A1 | * | 10/2012 | Kitamura | B60R 16/0215 174/72 A |
| 2012/0298404 | A1 | * | 11/2012 | Tokunaga | B60R 16/0215 174/135 |
| 2013/0056240 | A1 | * | 3/2013 | Kawai | H02G 3/0481 174/124 R |
| 2013/0319758 | A1 | * | 12/2013 | Toyama | B60R 16/0215 174/70 R |

FOREIGN PATENT DOCUMENTS

| | | |
|---|---|---|
| CN | 101373886 A | 2/2009 |
| CN | 201663399 U | 12/2010 |
| CN | 102729920 A | 10/2012 |
| JP | H1-180807 U | 12/1989 |
| JP | H08-196016 A | 7/1996 |
| JP | 2003134636 A | 5/2003 |
| JP | 2005166506 A | 6/2005 |
| JP | 2009-268254 A | 11/2009 |
| JP | 2013-027212 A | 2/2013 |

OTHER PUBLICATIONS

Sep. 30, 2014—International Search Report—Intl App PCT/JP2014/070817.

Feb. 23, 2017—(CN) The First Office Action—App 201480044807.3, Eng Tran.

* cited by examiner

ELECTRIC WIRE PROTECTIVE MEMBER

TECHNICAL FIELD

The present invention relates to an electric wire protective member.

BACKGROUND ART

Figure 11:
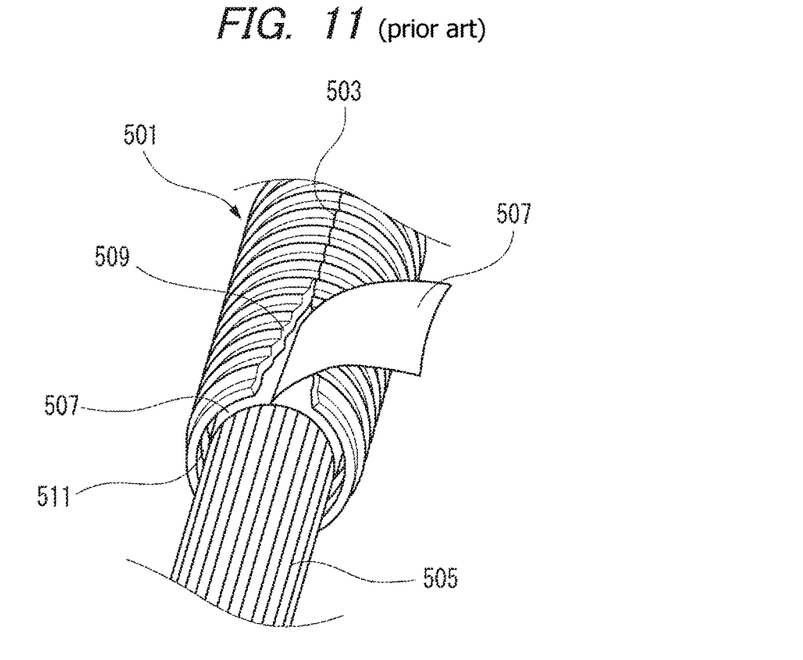
FIG. 11 is a perspective view showing the main components of the structure for fastening electric wires to the conventional electric wire protection tube.

Conventionally, flexible outer tubes (electric wire protection tubes), such as corrugated tubes made of synthetic resin, are attached to wire harnesses to be routed in automobiles and the like to prevent electric wires from being damaged by external interfering substances (see Patent Document 1). As shown in FIG. 11, a slit 503 is provided along the entire length of an electric wire protection tube 501 in the axial direction thereof, and the electric wire protection tube 501 is attached to a wire harness (electric wires) 505 by opening the slit 503 and by covering the wire harness 505 from the sides. In some cases, to position the electric wire protection tube 501 having the slit 503 in the axial direction with respect to the wire harness 505 inserted therein, the electric wire protection tube 501 his attached to the wire harness 505 with an adhesive tape 507. The adhesive tape 507 is also wound around the electric wire protection tube 501 to prevent the slit 503 from opening.

After winding the adhesive tape 507 around the outer periphery of the wire harness 505 inserted through the electric wire protection tube 501, the adhesive tape 507 is drawn out through the slit 503 at the distal end of the electric wire protection tube. The drawn-out adhesive tape 507 is wound around the outer periphery of the electric wire protection tube 501. More specifically, the adhesive tape 507 wound around the wire harness 505 on the inner peripheral side of the distal end portion of the electric wire protection tube 501 in which a cut portion 509 is located is drawn out through the cut portion 509 to the outer peripheral face of the electric wire protection tube 501, and the drawn-out adhesive tape 507 is wound approximately two times around the outer peripheral face of the electric wire protection tube 501 and the outer periphery of the cut portion 509.

PRIOR ART DOCUMENT

Patent Document

Patent Document 1: JP 2009-268254 A

SUMMARY OF INVENTION

Problem to be Solved by Invention

However, in the case of the conventional structure for attaching the electric wire protection tube 501 and the wire harness 505 together by taping, the inside diameter of the electric wire protection tube 501 is made larger than the outside diameter of the wire harness 505 to be inserted therein, and a clearance 511 is formed between the inner face of the peripheral wall of the electric wire protection tube 501 and the outer peripheral face of the wire harness 505. Therefore, the electric wire protection tube 501 cannot be sufficiently attached to the wire harness 505, and the attaching accuracy between the electric wire protection tube 501 and the wire harness 505 can be easily lowered. Moreover, if the adhesive tape 507 is wound tightly to attach the distal end portion of the electric wire protection tube 501 to the wire harness 505 by taping, the peripheral walls of the electric wire protection tube 501 opposed to each other on respective sides of the slit 503 can easily overlap each other to make the electric wire protection tube 501 in a rolled manner, thereby causing a problem in which the diameter of the electric wire protection tube 501 can be easily changed after the attachment by the taping. Further, the work for attaching the electric wire protection tube 501 and the wire harness 505 together is carried out by drawing out the adhesive tape 507 wound around the wire harness 505 on the inner peripheral side of the distal end portion of the electric wire protection tube 501 to the outer peripheral face of the electric wire protection tube 501 through the cut portion 509 and by winding the drawn-out adhesive tape 507 around the outer peripheral face of the tube. That is, the electric wire protection tube 501 and the winding 505 need to be positioned with respect to the axial direction while drawing out the adhesive tape 507 to the outer peripheral face of the electric wire protection tube 501 through the cut portion 509, thereby causing a problem in which the attaching work is not good.

The present invention has been made in view of the circumstances described above, and it is an object thereof to provide an electric wire protective member capable of improving the attaching accuracy and attaching work of electric wires and an electric wire protection tube.

Means for Solving the Problem

The object of the present invention is achieved by using the following configurations. (1) An electric wire protective member including a cylindrical electric wire protection tube, an interior of which being an electric wire insertion space, an electric wire lead-out opening provided in the electric wire protection tube and from which electric wires inserted through the electric wire insertion space are led out, and an electric wire fastening member having an electric wire fastening plate on which the electric wires led out through the electric wire lead-out opening are placed, the electric wire fastening plate being molded integrally with a ring-shaped covering portion covering the electric wire protection tube near the electric wire lead-out opening.

With the electric wire protective member having the configuration of (1) described above, the outer periphery of the electric wires led out through the electric wire lead-out opening of the electric wire protection tube and placed on the electric wire fastening plate is wound with an adhesive tape or the like together with the electric wire fastening plate of the electric wire fastening member, whereby the electric wires are fastened to the electric wire fastening plate. Since the ring-shaped covering portion molded integrally with the electric wire fastening plate of the electric wire fastening member to which the electric wires are fastened is molded and fastened to the electric wire protection tube, the relative movement of the electric wires with respect to the electric wire protection tube is restricted strongly. As a result, the electric wires inserted into the electric wire protection tube are positioned accurately with respect to the electric wire protection tube. In addition, the electric wire fastening plate on which the electric wires are placed protrudes to the outside of the electric wire lead-out opening and extends in the lead-out direction of the electric wires. Hence, in a state in which the electric wires are placed along the electric wire fastening plate, the operator is merely required to wind an adhesive tape or the like around the electric wires and the electric wire fastening plate altogether. Consequently, the operator can easily fasten the electric wires to the electric wire protection tube without requiring experienced skill.

(2) The electric wire protective member having the configuration of (1) described above, wherein the electric wire lead-out opening is a protection tube end opening at one end of the electric wire protection tube in an extending direction of the electric wire protection tube, and the electric wire fastening plate of the electric wire fastening member is a branch line fastening portion extending in a direction perpendicular to an axis of the electric wire protection tube.

With the electric wire protective member having the configuration of (2) described above, part of the electric wires inserted into the electric wire protection tube and led out through the protection pipe end opening serves as a branch line and is bent and led out in a direction perpendicular to a main line. The branch line is fastened with an adhesive tape or the like wound around the outer periphery thereof together with the branch line fastening portion of the electric wire fastening member, whereby the relative movement of the branch line with respect to the electric wire protection tube is restricted. In other words, the branch line is bent and held securely in the direction perpendicular to the axis of the electric wire protection tube. Hence, the operator can accurately position the branch line branched from the main line with respect to the electric wire protection tube by carrying out easy work not requiring experienced skill. Furthermore, the electric wire protective member configured as described above can be used in a state in which the protection tube end openings of a pair of electric wire protection tubes each having the same electric wire fastening member are butted to each other. In other words, the main line led out through the protection tube end opening of one of the electric wire protection tubes is introduced and inserted into the protection tube end opening of the other electric wire protection tube. At this time, the branch line branched while being bent in a direction perpendicular to the main line is held between the pair of branch fastening sections disposed above and below the branch line. The pair of branch line fastening portions between which the branch line is held is wound with an adhesive tape or the like and fastened. Hence, the branch line branched from the electric wires led out through the protection tube end opening of one of the electric wire protection tubes in a direction perpendicular to the main line is held and fastened securely between the branch line fastening portions of the electric wire fastening members disposed above and below the branch line. Consequently, even at the branch section in which the branch line is branched from the main line, the operator can accurately position the branch line with respect to the electric wire protection tube by carrying out easy work not requiring experienced skill. Moreover, the branch line fastening portion of the electric wire fastening member fastened to one of the electric wire protection tubes is separated from the branch line fastening portion of the electric wire fastening member fastened to the other electric wire protection tube, whereby the operator can easily carry out the work of branching the branch line from the main line.

(3) The electric wire protective member having the configuration of (1) described above, wherein the electric wire lead-out opening is the protection tube end opening at one end of the electric wire protection tube in the extending direction of the electric wire protection tube, and the electric wire fastening plate of the electric wire fastening member has a main line fastening portion extending in the direction along the axis of the electric wire protection tube and a branch line fastening portion extending in a direction perpendicular to the axis of the electric wire protection tube.

With the electric wire protective member having the configuration of (3) described above, to the main line fastening portion of the electric wire fastening plate in the electric wire fastening member, one end of the other electric wire protection tube can be fastened with a binding band, an adhesive tape or the like. In other words, the electric wire protection tube of the electric wire fastening member can be connected to the other electric wire protection tube using the electric wire fastening member molded on the electric wire protection tube. Hence, part of the electric wires inserted into the electric wire protection tube and led out through the protection tube end opening is bent and placed on the branch line fastening portion as a branch line, and the remaining electric wires are inserted into the other electric wire protection tube as a main line. Furthermore, the other electric wire protection tube into which the main line is inserted is fastened with a binding band, an adhesive tape or the like to the main line fastening portion. Moreover, the outer periphery of the branch line placed on the branch line fastening portion is wound with an adhesive tape or the like together with the branch line fastening portion, whereby the branch line is fastened to the branch line fastening portion. Consequently, with the electric wire protective member, the branching position of the branch line to be branched from the main line can be determined accurately with respect to the electric wire protection tube. Still further, before the main line is fastened to the main line fastening portion, since the other electric wire protection tube is separated from the electric wire protective member, the branch line can be branched easily from the main line.

(4) The electric wire protective member having the configuration of (1) described above, wherein the electric wire lead-out opening is the protection tube end opening at one end of the electric wire protection tube in the extending direction of the electric wire protection tube, and the electric wire fastening plate of the electric wire fastening member has a branch line fastening portion extending in a direction perpendicular to the axis of the electric wire protection tube and another ring-shaped covering portion molded to cover another electric wire protection tube near an electric wire lead-out opening of the another electric wire protection tube, the another electric wire protection tube being arranged across the branch line fastening portion from the electric wire protection tube and coaxial with the electric wire protection tube.

With the electric wire protective member having the configuration of (4) described above, the branching position of the branch line to be branched from the main line is determined by the branch line fastening portion of the electric wire fastening member. The electric wires inserted from the electric wire protection tube to the other electric wire protection tube are branched at the electric wire fastening member provided at the protection tube end openings of the two electric wire protection tubes, whereby the branch line can be branched while being positioned accurately with respect to the main line. Furthermore, before the electric wires are inserted from the electric wire protection tube into the other electric wire protection tube, the branch line having a predetermined number of electric wires serving as part of the electric wires led out through the protection tube end opening can be bent so as to be placed on the branch line fastening portion, whereby the work for branching the branch line can be carried out easily. The outer periphery of the branch line bent at the protection tube end opening and placed on the branch line fastening portion of the electric wire fastening member is wound with an adhesive tape or the like together with the branch line fastening portion, whereby the branch line is fastened thereto.

(5) The electric wire protective member having the configuration of (1) described above, wherein the electric wire lead-out opening is a protection tube intermediate opening bored through a tube wall of the electric wire protection tube at an intermediate portion of the electric wire protection tube in the extending direction of the electric wire protection tube, and the electric wire fastening member has the electric wire fastening plate molded integrally with the ring-shaped covering portion molded on the electric wire protection tube in a pair, interposing the protection tube intermediate opening therebetween.

With the electric wire protective member having the configuration of (5) described above, the branch line formed of a predetermined number of electric wires inserted into the electric wire protection tube and led out through the protection tube intermediate opening is placed on the electric wire fastening plate molded integrally with a pair of ring-shaped covering portions that are molded on the electric wire protection tube interposing the protection tube intermediate opening therebetween. The outer periphery of the branch line lead out through the protection tube intermediate opening is wound with an adhesive tape or the like together with the electric wire fastening plate, whereby the branch line is fastened thereto. Hence, even if a tension is exerted to the distal end side of the branch line, the branch line is not rubbed against the protection tube intermediate opening. As a result, the branch line can be prevented from being damaged by the edge of the protection tube intermediate opening.

Advantage of Invention

With the electric wire protective member according to the present invention, the attaching accuracy and attaching work of the electric wires and the electric wire protection tube can be improved.

The present invention has been briefly described above. The details of the present invention will be further clarified by reading through the following description of modes for carrying out the invention (hereafter "embodiments") with reference to the accompanying drawings.

BRIEF DESCRIPTION OF THE DRAWINGS

FIG. 7 includes (a) a perspective view showing the main components of a pair of electric wire protective members according to a second embodiment of the present invention, and (b) a perspective view showing the main components of a wire harness including the electric wire protective members shown in (a) of FIG. 7;

FIG. 8 includes (a) a perspective view showing the main components of an electric wire protective member according to a third embodiment of the present invention, and (b) a perspective view showing the main components of a wire harness including the electric wire protective member shown in (a) of FIG. 8;

FIG. 9 includes (a) a perspective view showing the main components of an electric wire protective member according to a fourth embodiment of the present invention, and (b) a perspective view showing the main components of a wire harness including the electric wire protective member shown in (a) of FIG. 9;

FIG. 10 includes (a) a perspective view showing an electric wire protection tube in which a protection tube intermediate opening is bored, (b) a perspective view showing the main components of an electric wire protective member according to a fifth embodiment of the present invention, and (c) a perspective view showing the main components of a wire harness including the electric wire protective member shown in (b) of FIG. 10.

EMBODIMENTS OF INVENTION

Figure 1:
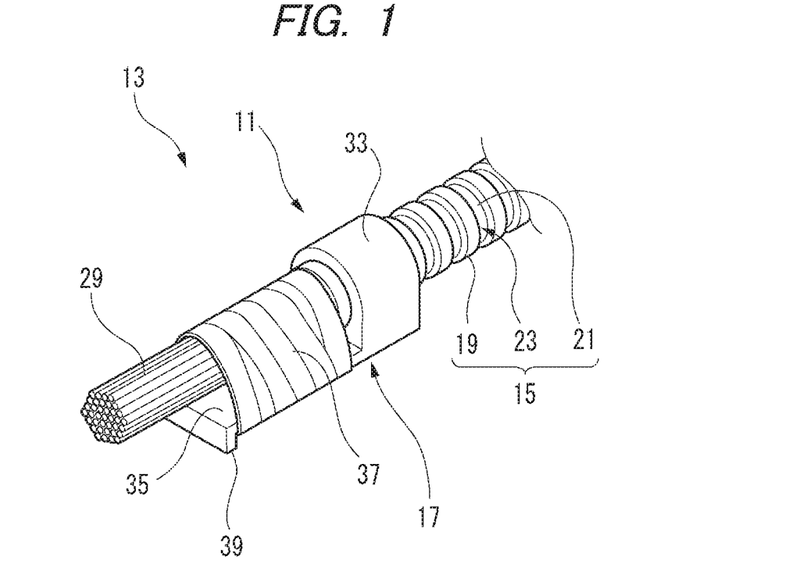
FIG. 1 is a perspective view showing the main components of a wire harness including an electric wire protective member according to a first embodiment of the present invention.
Figure 2:
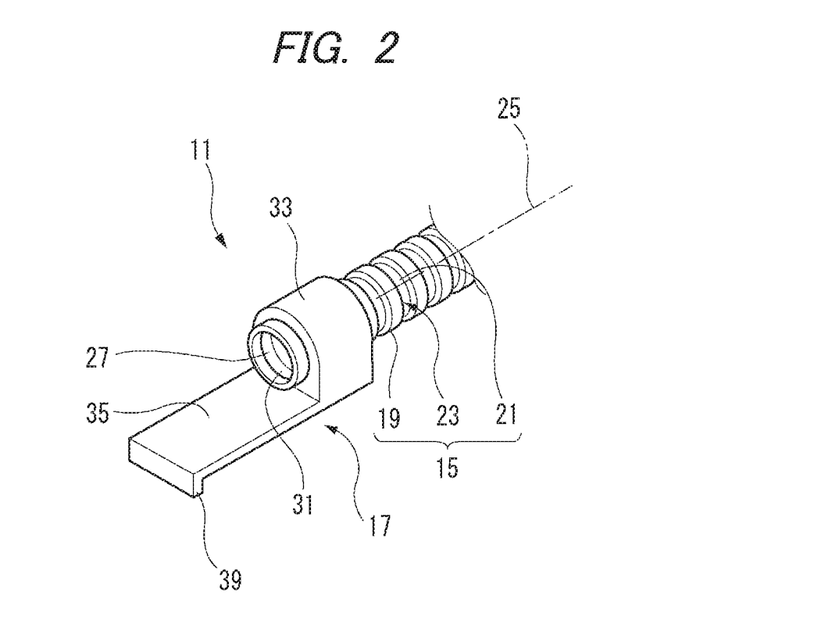
FIG. 2 is a perspective view showing the main components of the electric wire protective member shown in FIG. 1.

Hereinafter, embodiments of the present invention will be described with reference to the drawings. As shown in FIG. 1, an electric wire protective member 11 according to a first embodiment of the present invention is suitably used for a wire harness 13 to be provided for an automobile or the like. As shown in FIG. 2, the electric wire protective member 11 according to the first embodiment has a cylindrical electric wire protection tube 15, an interior of which being an electric wire insertion space 27, a protection tube end opening 31 configured as an electric wire lead-out opening, and an electric wire fastening member 17.

The electric wire protection tube 15 according to this embodiment is made of an insulating synthetic resin and has flexibility with respect to material and structure. The electric wire protection tube 15 is formed into a bellows shape so as to have flexibility in which a plurality of large-diameter sections 19 and a plurality of small-diameter sections 21 are connected alternately and a concaved outer peripheral groove 23 is formed between the large-diameter sections 19 adjacent to each other with the small-diameter section 21 provided therebetween. In other words, each of the large-diameter section 19 and the small-diameter section 21 is elastically deformable with respect to material and has flexibility with respect to structure. The so-called corrugated tube is suitably used as the electric wire protection tube 15. An elastic tube formed into a long cylindrical shape and a hard tube having no flexibility can also be used as the electric wire protection tube according to this embodiment as a matter of course. Furthermore, in the electric wire protection tube 15 according to this embodiment, a slit to allow electric wires 29 to be inserted is not formed; however, it is needless to say that such a slit may be formed over the entire length of the electric wire protection tube 15 in the direction along the axis 25 thereof.

In the first embodiment, the electric wire lead-out opening provided in the electric wire protection tube 15 and from which the electric wires 29 inserted through the electric wire insertion space 27 are led out is the protection tube end opening 31 provided at at least one end of the electric wire protection tube 15 in the extending direction of the electric wire protection tube 15.

The electric wire fastening member 17 according to the first embodiment is made of an insulating synthetic resin and has a ring-shaped covering portion 33 and an electric wire fastening plate 35 molded integrally with the ring-shaped covering portion 33. The ring-shaped covering portion 33 covers the electric wire protection tube 15 near the protection tube end opening 31 and is firmly attached by molding. In this embodiment, the ring-shaped covering portion 33 is molded on the outer peripheral face of the electric wire protection tube 15 near the protection tube end opening 31 such that it covers the outer peripheral grooves 23 and the large-diameter sections 19 adjacent thereto.

The electric wire fastening plate 35 is molded integrally with the ring-shaped covering portion 33. The electric wire fastening plate 35 according to the first embodiment is formed into a rectangular shape extending in the direction along the axis 25 of the electric wire protection tube 15. The electric wires 29 led out through the protection tube end opening 31 are placed on the electric wire fastening plate 35 having a rectangular strip shape. The electric wire fastening member 17 is inserted into a forming mold 70 (see FIG. 4) described later together with the electric wire protection tube 15 and molded. The ring-shaped covering portion 33 is molded over at least the two or more large-diameter sections 19. In the case that a slit is formed in the electric wire protection tube 15, the slit is also formed in the ring-shaped covering portion 33. As a result, the ring-shaped covering portion 33 has a C-shaped cross section and becomes open.

Moreover, as shown in FIG. 1, the outer periphery of the electric wires 29 placed on the electric wire fastening plate 35 having a rectangular strip shape is wound together with the electric wire fastening plate 35, whereby the electric wires 29 are fastened to the electric wire fastening member 17. A portion 39 for preventing the adhesive tape 37 from slipping off is provided so as to hang down on the distal end side of the electric wire fastening plate 35 in the extending direction thereof. The electric wires 29 wound with the adhesive tape 37 together with the electric wire fastening plate 35 is integrally fastened to the electric wire fastening plate 35 by the adhesive force of the adhesive tape 37. With this configuration, since the electric wires 29 are fastened to the electric wire protection tube 15 via the electric wire fastening plate 35 and the ring-shaped covering portion 33 of the electric wire fastening member 17, even if a tension is exerted to the electric wires 29 inserted into the electric wire protection tube 15, the electric wires 29 and the electric wire protection tube 15 are securely restricted from moving relatively in the direction along the axis 25.

The function of the electric wire protective member 11 having the above configuration will be described. In the electric wire protective member 11 according to the first embodiment, the ring-shaped covering portion 33 of the electric wire fastening member 17 is firmly attached to the electric wire protection tube 15 near the protection tube end opening 31 by molding. The electric wire fastening plate 35 is molded integrally with the ring-shaped covering portion 33, and the outer periphery of the electric wires 29 led out through the protection tube end opening 31 and placed on the electric wire fastening plate 35 is wound by the adhesive tape 37 together with the electric wire fastening plate 35, whereby the electric wires 29 are fastened to the electric wire fastening plate 35. Since the ring-shaped covering portion 33 molded integrally with the electric wire fastening plate 35 of the electric wire fastening member 17 to which the electric wires 29 are fastened is molded and fastened to the electric wire protection tube 15, the relative movement of the electric wires 29 with respect to the electric wire protection tube 15 is restricted strongly. As a result, the electric wires 29 inserted into the electric wire protection tube 15 are positioned accurately with respect to the electric wire protection tube 15.

In addition, the electric wire fastening plate 35 on which the electric wires 29 are placed protrudes to the outside of the protection tube end opening 31 and extends in the lead-out direction of the electric wires 29. Hence, in a state in which the electric wires 29 are placed along the electric wire fastening plate 35, the operator is merely required to wind the adhesive tape 37 around the electric wires and the electric wire fastening plate altogether. Consequently, with the electric wire protective member 11 described above, the operator can easily fasten the electric wires 29 to the electric wire protection tube 15 without requiring experienced skill.

Figure 3:
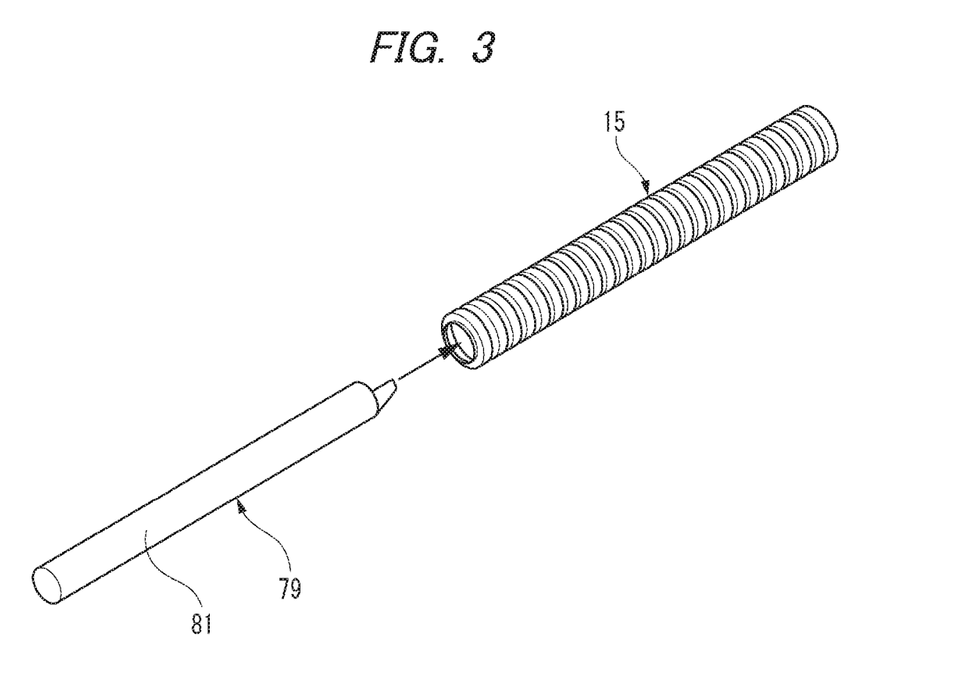
FIG. 3 is a perspective view showing an electric wire protection tube and a core.

Next, a method of producing the electric wire protective member 11 described above will be described. As shown in FIG. 3, first, a core 79 is inserted into the electric wire protection tube 15 to mold the electric wire protective member 11. The core 79 is composed of a shaft 81 having a diameter nearly equal to the inside diameter of the electric wire protection tube 15 so as to be insertable therein. The shaft 81 serving as the core 79 is inserted into the electric wire protection tube 15 before the electric wire protection tube 15 is set in the forming mold 70. Hence, the electric wire protection tube 15 is not crushed by the injection pressure of a molding resin heated to a high temperature.

Figure 4:
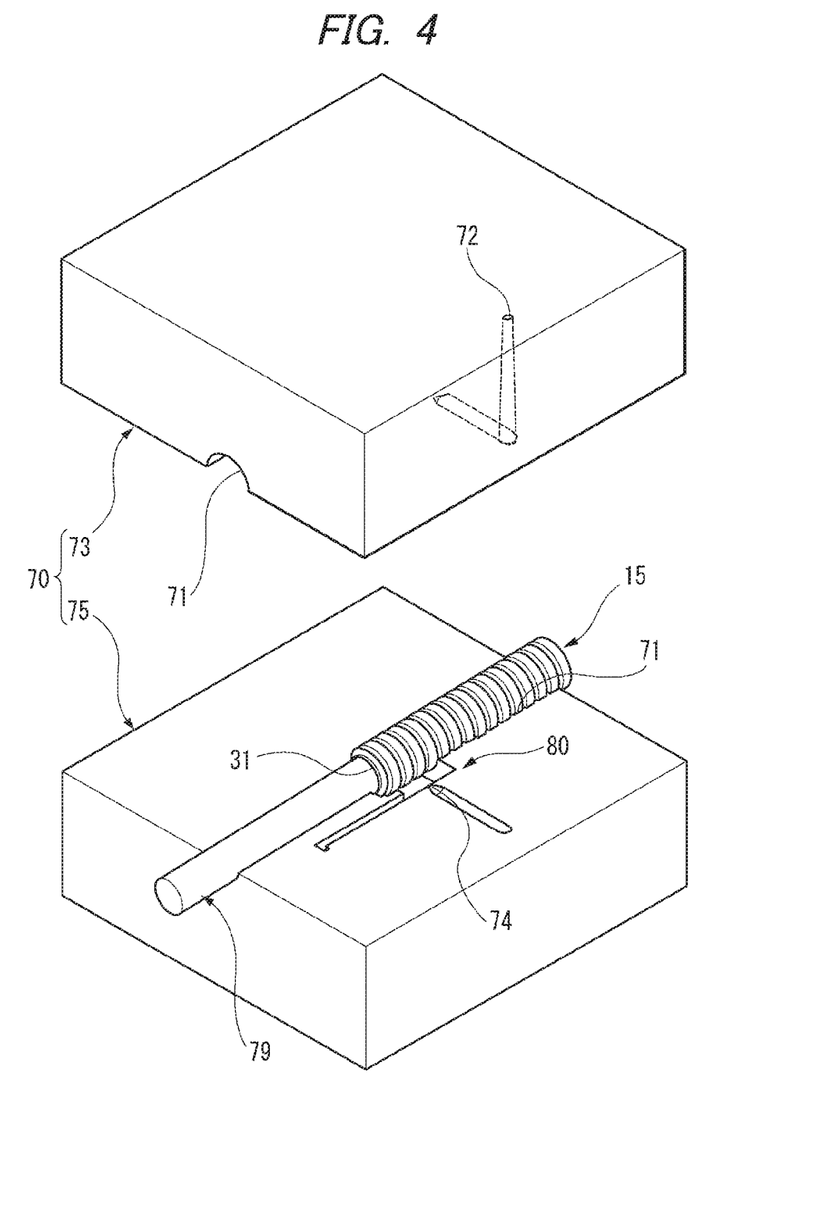
FIG. 4 is a perspective view showing a forming mold in an open state with the electric wire protection tube and the core being set in the lower mold thereof.
Figure 5:
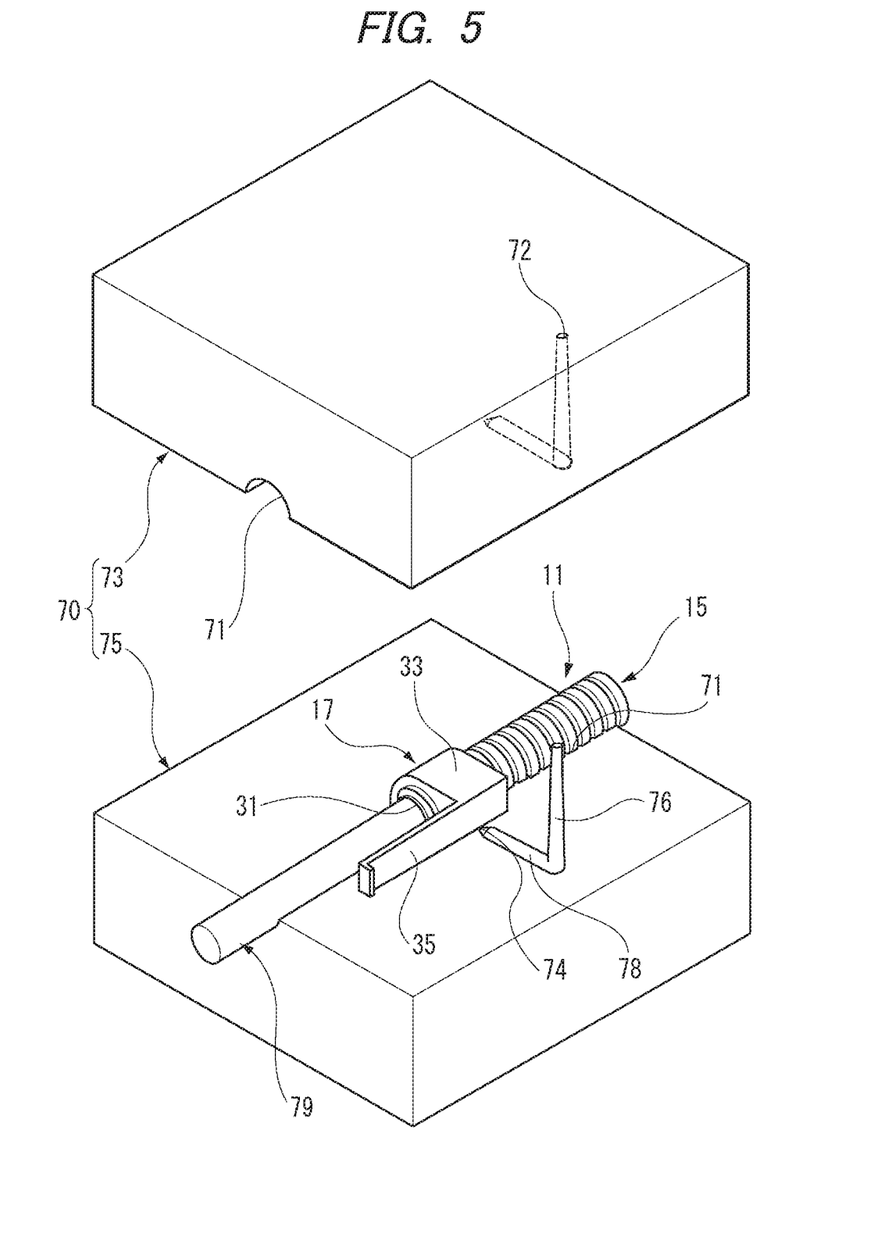
FIG. 5 is a perspective view showing the forming mold in an open state after the electric wire protective member is formed.

As shown in FIG. 4, the forming mold 70 is composed of an upper mold 73 and a lower mold 75 each made of a synthetic resin. The electric wire protection tube 15 in which the core 79 has been inserted is disposed in the electric wire protection tube accommodation sections 71 of the upper mold 73 and the lower mold 75. The upper mold 73 and the lower mold 75 are mold-clamped by a mold clamping device while the electric wire protection tube 15 is held therebetween. A cavity 80 corresponding to the ring-shaped covering portion 33 and the electric wire fastening plate 35 forming the electric wire fastening member 17 is disposed between the electric wire protection tube 15 disposed inside and the inner faces of the electric wire protection tube accommodation sections 71. In this state, a molten thermoplastic resin is injected at low pressure from the supply passage 72 of the upper mold 73 to the cavity 80 via a gate 74. A predetermined amount of the thermoplastic resin is supplied and the cavity 80 is filled with the thermoplastic resin. The thermoplastic resin is cured, whereby the electric wire fastening member 17 having the ring-shaped covering portion 33 and the electric wire fastening plate 35, the outer shape of the electric wire fastening member 17 being identical to the inner face shape of the cavity 80, is molded on the outer periphery of the electric wire protection tube 15. As shown in FIG. 5, a molded product is then taken out from the upper mold 73 and the lower mold 75 of the forming mold 70 being opened, and a sprue 76 and a runner 78 are removed from the gate 74, whereby the production of the electric wire protective member 11 is completed.

Figure 6:
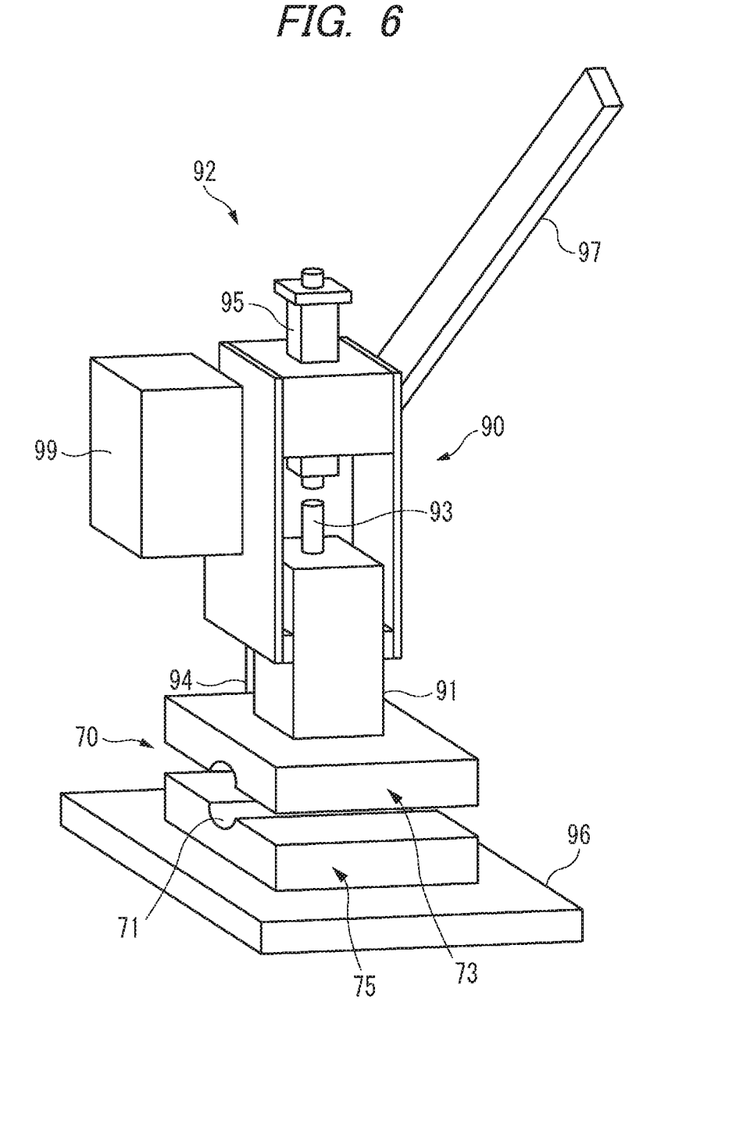
FIG. 6 is a perspective view showing a micro molding machine.

The micro molding machine 92 shown in FIG. 6 is used to inject the thermoplastic resin into the cavity 80 inside the forming mold 70. The micro molding machine 92 is a molding machine that can be operated by a single operator without using any external driving device such as an electric motor and is composed of a mold clamping device (not shown) for opening and closing the upper mold 73 and the lower mold 75 and a low pressure injection device 90 for pressure injecting a molten resin into the forming mold 70. The low pressure injection device 90 has a heating cylinder 91 provided with a heater for heating and melting, for example, a synthetic resin such as polypropylene; a plunger 93 for injecting the molten resin inside the heating cylinder 91 through a nozzle, not shown; an injection cylinder 95 for moving the plunder 93 forward; a handle 97 for driving the injection cylinder 95; and a temperature controller 99 for keeping the heating temperature of the heating cylinder 91 at a desired temperature, and these components are supported by a support pillar 94 standing upright on a pedestal 96.

The micro molding machine 92 according to this embodiment is a machine in which the amount of a resin that can be molded by a single injection molding process is up to approximately several ten grams and the mold clamping of the forming mold 70 can be carried out manually using an air cylinder or a link mechanism, for example. The injection cylinder 95 of the low pressure injection device 90 may be driven by an external driving device, such as an electric motor or a pneumatic device. The "injecting molding apparatuses" disclosed, for example, in JP2010-260297A, JP2012-30429A and JP2013-103492A can be used.

The forming mold 70 according to this embodiment is disposed on the pedestal 96. The upper mold 73 and the lower mold 75 of the forming mold 70 are aligned with each other such that the electric wire protection tube 15 is held therebetween and accommodated in the electric wire protection tube accommodation sections 71, whereby the cavity 80 serves as a hollow space in which molding can be carried out. A molten thermoplastic resin is then supplied from the supply passage 72 into the hollow space via the sprue 76, the runner 78 and the gate 74, whereby the electric wire fastening member 17 is formed by injection molding on the outer periphery of the electric wire protection tube 15 near the protection tube end opening 31, and the electric wire protective member 11 is formed. Although the forming mold 70 has been described as a horizontally split mold in this embodiment, the forming mold 70 may be a vertically split mold.

Figure 7:
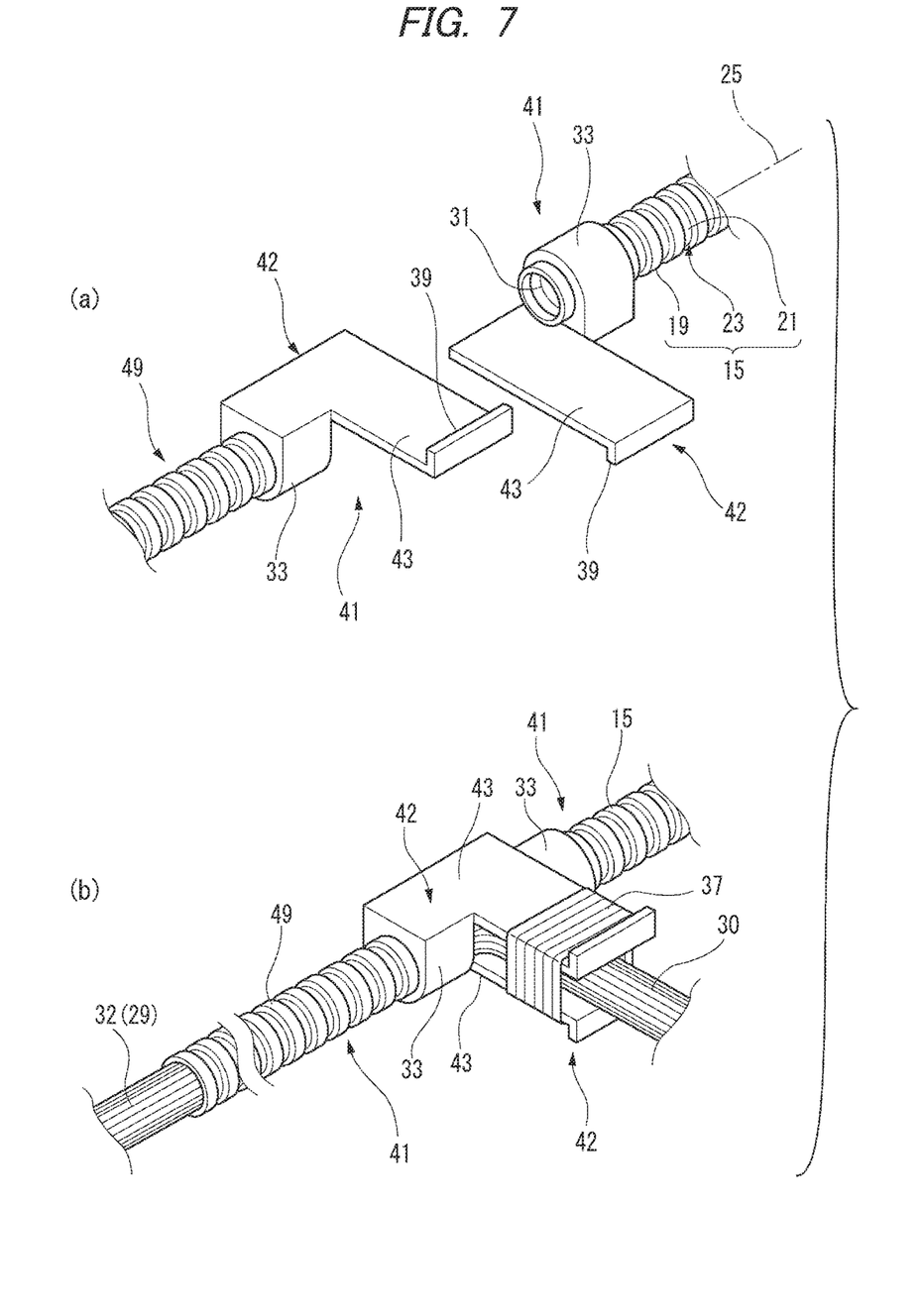

Next, an electric wire protective member 41 according to a second embodiment of the present invention will be described. In the following respective embodiments, the same components as those of the electric wire protective member 11 according to the first embodiment shown in FIGS. 1 and 2 are designated by the same reference numerals and overlapping descriptions are omitted. As shown in (a) of FIG. 7, also in the second embodiment, the electric wire lead-out opening provided in the electric wire protection tube 15 and from which the electric wires 29 inserted through the electric wire insertion space 27 are led out is the protection tube end opening 31 provided at at least one end of the electric wire protection tube 15 in the extending direction of the electric wire protection tube 15. Furthermore, in the second embodiment, the branch line fastening portion (electric wire fastening plate) 43 of the electric wire fastening member 42 molded integrally with the ring-shaped covering portion 33 is formed into a rectangular shape extending in a direction perpendicular to the axis 25 of the electric wire protection tube 15.

With the electric wire protective member 41 according to the second embodiment, part of the electric wires 29 inserted into the electric wire protection tube 15 and led out through the protection pipe end opening 31 serves as a branch line 30 and is bent and led out in a direction perpendicular to the axis 25. The branch line 30 is fastened with the adhesive tape 37 wound around the outer periphery thereof together with the branch line fastening portion 43 of the electric wire fastening member 42, whereby the relative movement of the branch line 30 with respect to the electric wire protection tube 15 is restricted. In other words, the branch line 30 is bent and held securely in a direction perpendicular to the axis 25. Hence, the operator can accurately position the branch line 30 branched from the electric wires 29 with respect to the electric wire protection tube 15 by carrying out easy work not requiring experienced skill.

Furthermore, as shown in (b) FIG. 7, the electric wire protective member 41 according to the second embodiment can be used in a state in which the protection tube end openings 31 of a pair of electric wire protection tubes 15, 49 each having the same electric wire fastening member 42 are butted to each other. In other words, the main line 32 of the electric wires 29 led out through the protection tube end opening 31 of the electric wire protection tube 15 serving as one of the electric wire protection tubes is introduced and inserted into the protection tube end opening 31 of the other electric wire protective member 49. At this time, the branch line 30 branched while being bent in a direction perpendicular to the main line 32 is held between the pair of branch fastening sections 43 disposed above and below the branch line 30. The pair of branch line fastening portions 43 between which the branch line 30 is held is wound with the adhesive tape 37 and fastened.

Hence, the branch line 30 branched from the electric wires 29 led out through the protection tube end opening 31 of the electric wire protection tube 15 serving as one of the electric wire protection tubes in a direction perpendicular to the main line 32 is held and fastened securely between the branch line fastening portions 43 of the electric wire fastening members 42 disposed above and below the branch line. Consequently, even at the branch section in which the branch line 30 is branched from the main line 32 of the electric wires 29, the operator can accurately position the branch line 30 with respect to the electric wire protection tube 15 by carrying out easy work not requiring experienced skill. Moreover, the branch line fastening portion 43 of the electric wire fastening member 42 fastened to the electric wire protection tube 15 serving as one of the electric wire protection tubes is separated from the branch line fastening portion 43 of the electric wire fastening member 42 fastened to the other electric wire protection tube 49, whereby the operator can easily carry out the work of branching the branch line 30 from the main line 32.

Figure 8:
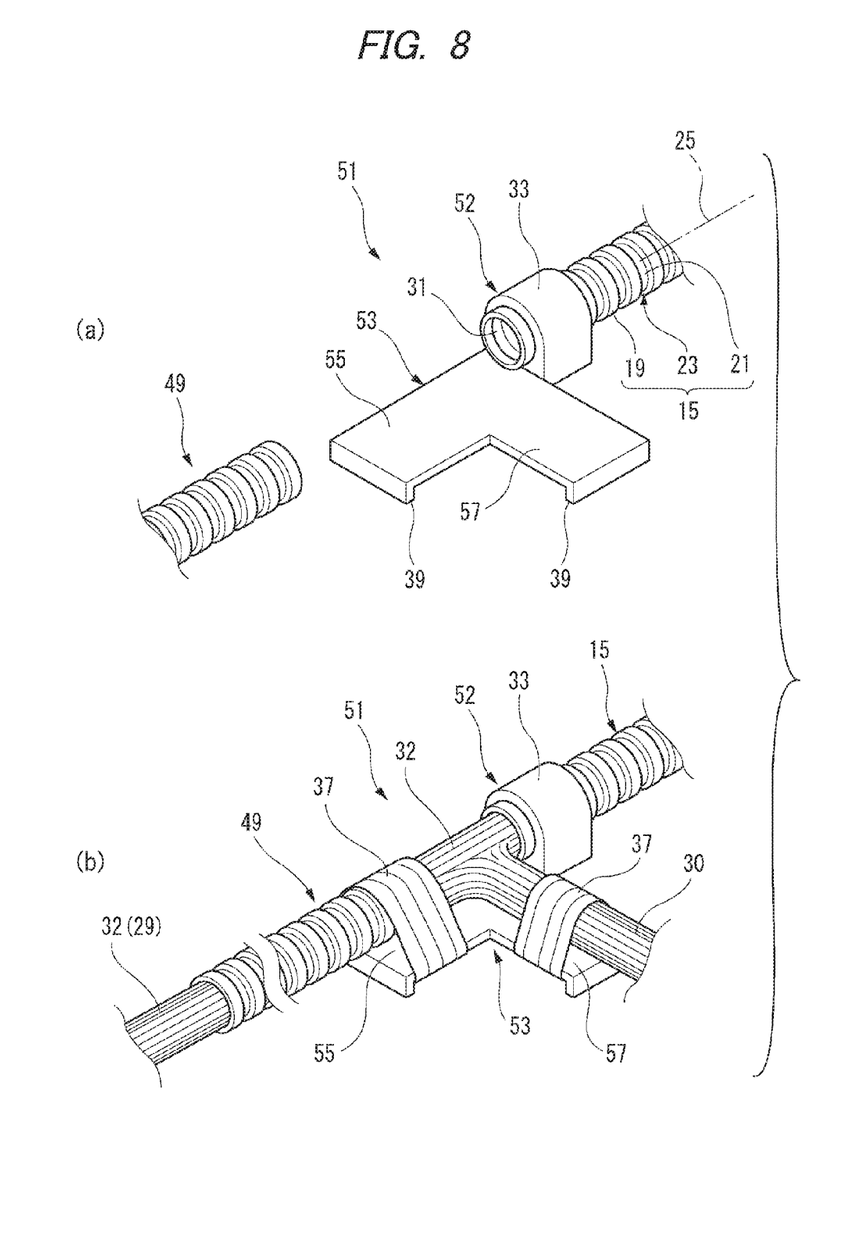

Next, an electric wire protective member 51 according to a third embodiment of the present invention will be described. As shown in (a) of FIG. 8, also in the third embodiment, the electric wire lead-out opening which is provided in the electric wire protection tube 15 and from which the electric wires 29 inserted into the electric wire insertion space 27 are led out is the protection tube end opening 31 provided at at least one end of the electric wire protection tube 15 in the extending direction of the electric wire protection tube 15. Furthermore, in the third embodiment, the electric wire fastening plate 53 of the electric wire fastening member 52 molded integrally with the ring-shaped covering portion 33 is formed into an L-shape having a main line fastening portion 55 extending in the direction along the axis 25 of the electric wire protection tube 15 and a branch line fastening portion 57 extending in a direction perpendicular to the axis 25 of the electric wire protection tube 15.

With the electric wire protective member 51 according to the third embodiment, as shown in (b) of FIG. 8, to the main line fastening portion 55 of the electric wire fastening plate 53 in the electric wire fastening member 52 of the electric wire protection tube 15, one end of the other electric wire protection tube 49 can be fastened with the adhesive tape 37 (or a binding band or the like). In other words, the electric wire protection tube 15 of the electric wire fastening member 51 can be connected to the other electric wire protection tube 49 using the electric wire fastening member 52 molded on the electric wire protection tube 15. Hence, part of the electric wires 29 inserted into the electric wire protection tube 15 and led out through the protection pipe end opening 31 is bent and placed on the branch line fastening portion 57 as a branch line 30, and the remaining electric wires 29 are inserted into the other electric wire protection tube 49 as a main line 32.

Furthermore, the other electric wire protection tube 49 into which the main line 32 is inserted is fastened with the adhesive tape 37 to the main line fastening portion 55. Moreover, the outer periphery of the branch line 30 placed on the branch line fastening portion 57 is wound with the adhesive tape 37 together with the branch line fastening portion 57, whereby the branch line 30 is fastened to the branch line fastening portion 57. Consequently, with the electric wire protective member 51 according to the third embodiment, the branching position of the branch line 30 to be branched from the main line 32 can be determined accurately with respect to the electric wire protection tube 15. Still further, when the main line 32 is fastened to the main line fastening portion 55, since the other electric wire protection tube 49 is separated from the electric wire protective member 51, the branch line 30 can be branched easily from the main line 32.

Figure 9:
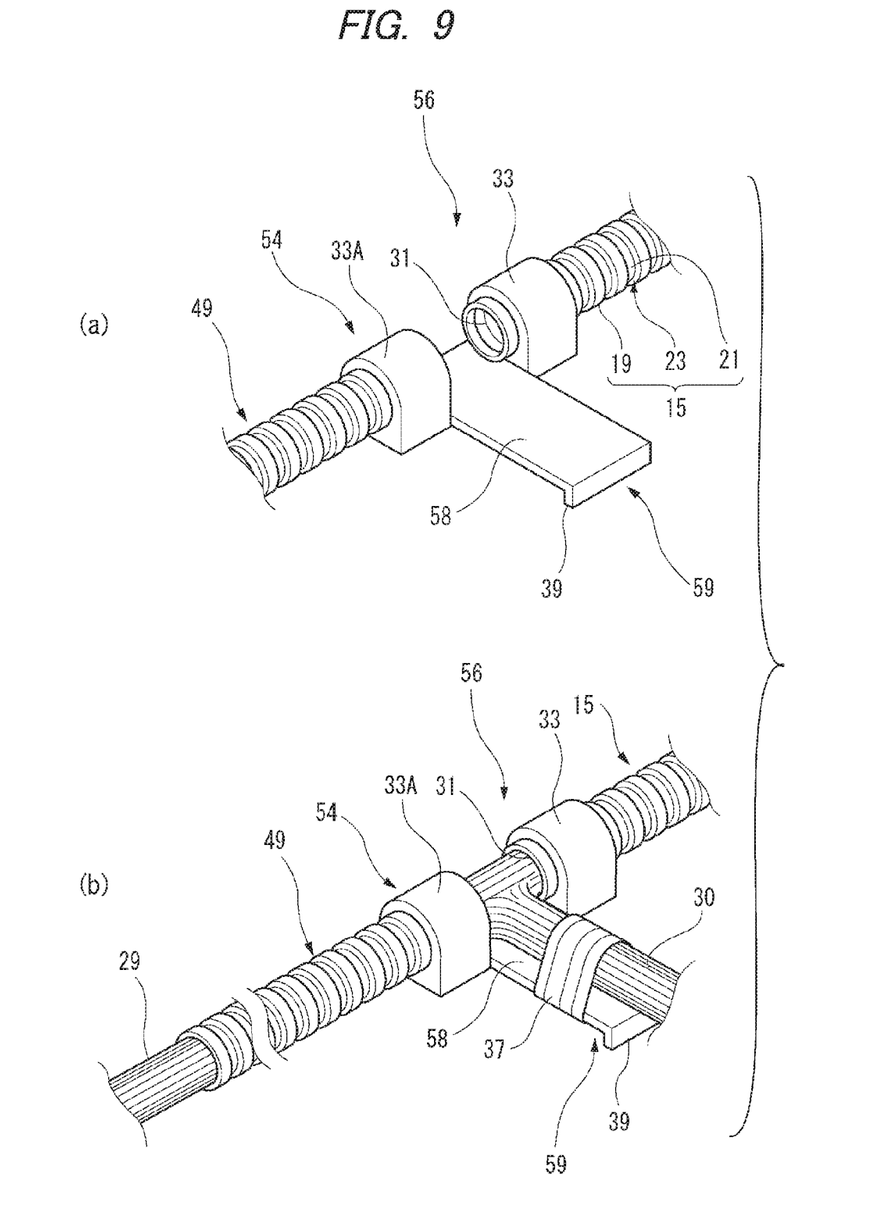

Next, an electric wire protective member 56 according to a fourth embodiment of the present invention will be described. As shown in (a) of FIG. 9, also in the fourth embodiment, the electric wire lead-out opening which is provided in the electric wire protection tube 15 and from which the electric wires 29 inserted into the electric wire insertion space 27 are led out is the protection tube end opening 31 provided at at least one end of the electric wire protection tube 15 in the extending direction of the electric wire protection tube 15. Further, in the fourth embodiment, the electric wire fastening plate 54 of the electric wire fastening member 59 molded integrally with the ring-shaped covering portion 33 has a branch line fastening portion 58 extending in a direction perpendicular to the axis 25 of the electric wire protection tube 15 and another ring-shaped covering portion 33A molded to cover another electric wire protection tube 49 near a protection tube end opening 31 of the electric wire protection tube 49, the electric wire protection tube 49 being arranged across the branch line fastening portion 58 from the electric wire protection tube 15 and coaxial with the electric wire protection tube 15.

Consequently, with the electric wire protective member 56 according to the fourth embodiment, the branching position of the branch line 30 to be branched from the main line 32 is determined by the branch line fastening portion 58 of the electric wire fastening member 59. The electric wires 29 inserted from the electric wire protection tube 15 into the other electric wire protection tube 49 are branched at the electric wire fastening member 59 provided between the protection tube end openings 31 of the two electric wire protection tubes 15, 49, whereby the branch line 30 can be branched while being positioned accurately with respect to the main line 32.

Furthermore, before the electric wires 29 are inserted from the electric wire protection tube 15 into the other electric wire protection tube 49, the branch line 30 having a predetermined number of electric wires serving as part of the electric wires 29 led out through the protection tube end opening 31 can be bent so as to be placed on the branch line fastening portion 58, whereby the work for branching the branch line 30 can be carried out easily. The outer periphery of the branch line 30 bent at the protection tube end opening 31 and placed on the branch line fastening portion 58 of the electric wire fastening member 59 is wound with the adhesive tape 37 together with the branch line fastening portion 58, whereby the branch line is fastened thereto. The main line 32 is inserted into the other electric wire protection tube 49.

Figure 10:
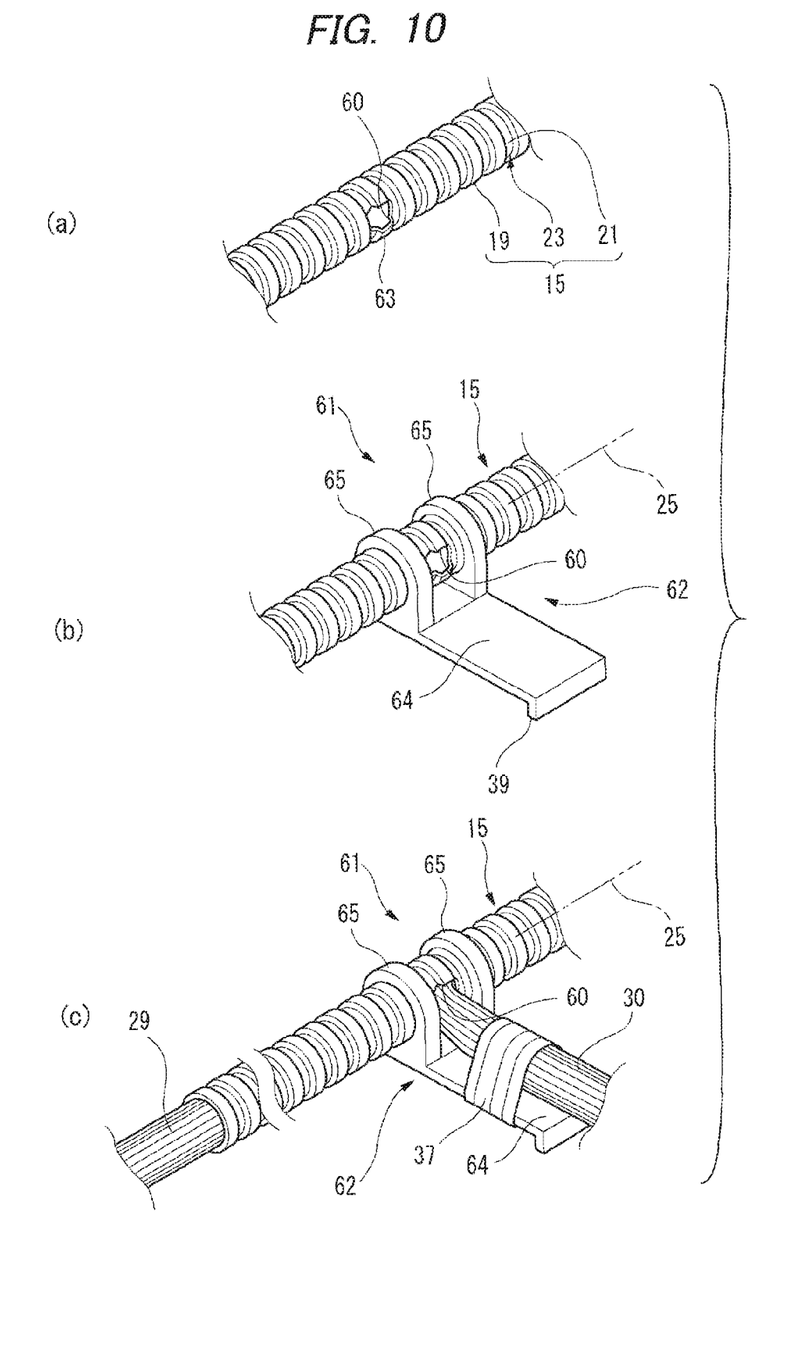

Next, an electric wire protective member 61 according to a fifth embodiment of the present invention will be described. As shown in (a) of FIG. 10, a protection tube intermediate opening 60 serving as an electric wire lead-out opening, which is provided in the electric wire protection tube 15 of the electric wire protective member 61 according to the fifth embodiment and from which the electric wires 29 inserted into the electric wire insertion space 27 are led out, is bored through the tube wall 63 of the intermediate portion of the electric wire protection tube 15 in the extending direction thereof. As shown in (b) of FIG. 10, an electric wire fastening member 62 according to the fifth embodiment has a pair of ring-shaped covering portions 65 molded on the outer peripheral face of the electric wire protection tube 15 interposing the protection tube intermediate opening 60 therebetween and a rectangular electric wire fastening plate 64 molded integrally with these ring-shaped covering portions 65. The electric wire fastening plate 64, the base end side of which is connected to the pair of ring-shaped covering portions 65, is extended in a direction perpendicular to the axis 25 of the electric wire protection tube 15.

With the electric wire protective member 61 according to the fifth embodiment, the branch line 30 formed of a predetermined number of the electric wires inserted into the electric wire protection tube 15 and led out through the protection tube intermediate opening 60 is bent in a direction perpendicular to the axis 25 and drawn out from the protection tube intermediate opening 60. The drawn-out branch line 30 is placed on the electric wire fastening plate 64 molded integrally with the pair of ring-shaped covering portions 65 that are molded on the electric wire protection tube 15 interposing the protection tube intermediate opening 60 therebetween. The outer periphery of the branch line 30 placed on the electric wire fastening plate 64 is wound with the adhesive tape 37 together with the electric wire fastening plate 64, whereby the branch line is fastened thereto. Hence, even if a tension is exerted to the distal end side of the branch line 30 fastened to the electric wire fastening plate 64, the branch line 30 is not pulled and is not rubbed against the protection tube intermediate opening 60. As a result, the branch line 30 is prevented from being damaged due to contact with the edge of the protection tube intermediate opening 60.

Consequently, with the electric wire protective members 11, 41, 51, 61 according to the respective embodiments described above, the attaching accuracy and attaching work of the electric wires 29 and the electric wire protection tube 15 can be improved.

Features of the embodiments of the electric wire protective members according to the present invention described above will be briefly summarized and listed below.

[1] An electric wire protective member 11 including a cylindrical electric wire protection tube 15, an interior of which being an electric wire insertion space 27, an electric wire lead-out opening (a protection tube end opening) 31 provided in the electric wire protection tube 15 and from which electric wires 29 inserted through the electric wire insertion space 27 are led out, and an electric wire fastening member 17 having an electric wire fastening plate 35 on which the electric wires 29 led out through the electric wire lead-out opening (the protection tube end opening) 31 are placed, the electric wire fastening plate 35 being molded integrally with a ring-shaped covering portion 33 covering the electric wire protection tube 15 near the electric wire lead-out opening (the protection tube end opening) 31.

[2] The electric wire protective member 41 having the configuration of [1] described above, wherein the electric wire lead-out opening (the protection tube end opening) 31 is the protection tube end opening 31 at one end of the electric wire protection tube 15 in an extending direction of the electric wire protection tube 15, and the electric wire fastening plate (a branch line fastening portion) 43 of the electric wire fastening member 42 is a branch line fastening portion 43 extending in a direction perpendicular to the axis 25 of the electric wire protection tube 15.

[3] The electric wire protective member 51 having the configuration of [1] described above, wherein the electric wire lead-out opening (the protection tube end opening) 31 is the protection tube end opening 31 at one end of the electric wire protection tube 15 in the extending direction of the electric wire protection tube 15, and the electric wire fastening plate 53 of the electric wire fastening member 52 has a main line fastening portion 55 extending in a direction along the axis 25 of the electric wire protection tube 15 and a branch line fastening portion 57 extending in the direction perpendicular to the axis 25 of the electric wire protection tube 15.

[4] The electric wire protective member 56 having the configuration of [1] described above, wherein the electric wire lead-out opening (the protection tube end opening) 31 is the protection tube end opening 31 at one end of the electric wire protection tube 15 in the extending direction of the electric wire protection tube 15, and the electric wire fastening plate (the branch line fastening portion) 58 of the electric wire fastening member 59 has a branch line fastening portion 58 extending in the direction perpendicular to the axis 25 of the electric wire protection tube 15 and another ring-shaped covering portion 33A molded to cover another electric wire protection tube 49 near an electric wire lead-out opening (a protection tube end opening) 31 of the another electric wire protection tube 49, the another electric wire protection tube 49 being arranged across the branch line fastening portion 58 from the electric wire protection tube 15 and coaxial with the electric wire protection tube 15.

[5] The electric wire protective member 61 having the configuration of [1] described above, wherein the electric wire lead-out opening (a protection tube intermediate opening) 60 is a protection tube intermediate opening 60 bored through a tube wall 63 of the electric wire protection tube 15 at an intermediate portion of the electric wire protection tube 15 in the extending direction of the electric wire protection tube 15, and the electric wire fastening member 62 has the electric wire fastening plate 64 molded integrally with the ring-shaped covering portion 65 molded on the electric wire protection tube 15 in a pair, interposing the protection tube intermediate opening 60 therebetween.

The present invention is not limited to the embodiments described above, and may be modified or improved as necessary. The materials, shapes, dimensions, quantities, arranging locations, and the like of the respective components in the embodiments described above are optional and not limited, in so far as the present invention can be implemented. The present application is based on Japanese Patent Application No. 2013-164473 filed on Aug. 7, 2013, the content of which is incorporated herein by reference.

INDUSTRIAL APPLICABILITY

The present invention can provide an electric wire protective member wherein the attaching accuracy and attaching work of electric wires and an electric wire protection tube are improved.

DESCRIPTION OF REFERENCE SIGNS

11 . . . electric wire protective member
15 . . . electric wire protection tube
17 . . . electric wire fastening member
27 . . . electric wire insertion space
29 . . . electric wires
30 . . . branch line
31 . . . protection tube end opening (electric wire lead-out opening)
33 . . . ring-shaped covering portion
35 . . . electric wire fastening plate

The invention claimed is:

1. An electric wire protective member comprising:
   a cylindrical electric wire protection tube, an interior of which being an electric wire insertion space;
   an electric wire lead-out opening provided in the electric wire protection tube and from which electric wires inserted through the electric wire insertion space are led out; and
   an electric wire fastening member having an electric wire fastening plate on which the electric wires led out through the electric wire lead-out opening are placed, the electric wire fastening plate being molded integrally with a ring-shaped covering portion covering the electric wire protection tube near the electric wire lead-out opening.

2. The electric wire protective member according to claim 1, wherein the electric wire lead-out opening is a protection tube end opening at one end of the electric wire protection tube in an extending direction of the electric wire protection tube, and
   wherein the electric wire fastening plate of the electric wire fastening member is a branch line fastening portion extending in a direction perpendicular to an axis of the electric wire protection tube.

3. The electric wire protective member according to claim 1, wherein the electric wire lead-out opening is a protection tube end opening at one end of the electric wire protection tube in an extending direction of the electric wire protection tube, and
   wherein the electric wire fastening plate of the electric wire fastening member has a main line fastening portion extending in a direction along an axis of the electric wire protection tube and a branch line fastening portion extending in a direction perpendicular to the axis of the electric wire protection tube.

4. The electric wire protective member according to claim 1, wherein the electric wire lead-out opening is a protection tube end opening at one end of the electric wire protection tube in an extending direction of the electric wire protection tube, and
   wherein the electric wire fastening plate of the electric wire fastening member has a branch line fastening portion extending in a direction perpendicular to an axis of the electric wire protection tube and another ring-shaped covering portion molded to cover another electric wire protection tube near an electric wire lead-out opening of the another electric wire protection tube, the another electric wire protection tube being arranged across the branch line fastening portion from the electric wire protection tube and coaxial with the electric wire protection tube.

5. The electric wire protective member according to claim 1, wherein the electric wire lead-out opening is a protection tube intermediate opening bored through a tube wall of the electric wire protection tube at an intermediate portion of the electric wire protection tube in an extending direction of the electric wire protection tube, and wherein the electric wire fastening member has the electric wire fastening plate molded integrally with the ring-shaped covering portion molded on the electric wire protection tube in a pair, interposing the protection tube intermediate opening therebetween.

6. The electric wire protective member according to claim 1, wherein the electric wire fastening plate is configured to allow the electric wires led out from the electric wire lead-out opening and mounted on the electric wire fastening plate to be wound with an adhesive tape together with the electric wire fastening plate to fasten the electric wires to the electric wire fastening plate, and the ring-shaped covering portion is molded such that the ring-shaped covering portion is fastened to the electric wire protection tube, so that the electric wire fastening member restricts relative movement of the electric wires with respect to the electric wire protection tube.

* * * * *